Dec. 15, 1970  J. W. CARINO ET AL  3,548,264
ELECTROLYTIC CAPACITOR RIVET SEAL
Filed June 10, 1968
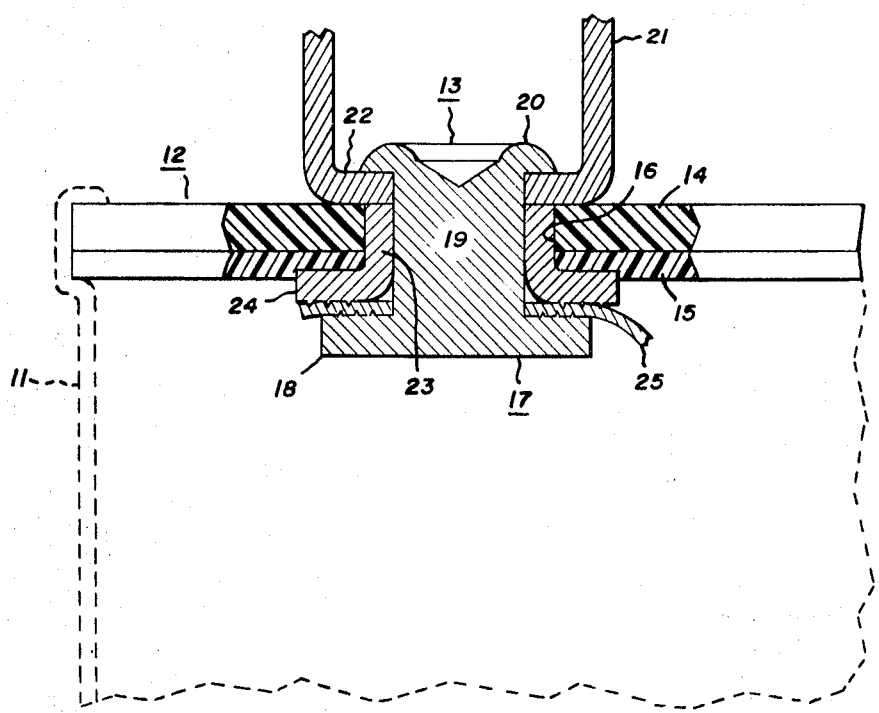
INVENTORS:
JOHN W. CARINO,
ROBERT H. BAINBRIDGE,
BY James J. Lichiello
THEIR ATTORNEY.

3,548,264
ELECTROLYTIC CAPACITOR RIVET SEAL
John W. Carino and Robert H. Bainbridge, Columbia, S.C., assignors to General Electric Company, a corporation of New York
Filed June 10, 1968, Ser. No. 735,783
Int. Cl. H01g 9/10
U.S. Cl. 317—230                             1 Claim

ABSTRACT OF THE DISCLOSURE

A capacitor rivet seal terminal structure for a capacitor cover is disclosed which includes a flanged metal sleeve surrounding a rivet, with the flange of the sleeve concentrically engaging the rivet head in nesting relationship internally of the capacitor, and the other end of the sleeve engaging a terminal lug flange externally of the capacitor.

---

This invention relates to a capacitor rivet terminal seal and more particularly to an electrolytic capacitor rivet terminal seal which incorporates a surrounding sleeve assembly to provide a rigid unitary metal structure.

Rivet terminal assemblies, particularly for electrolytic capacitors, usually pass through a cover means in the capacitor and are subject to a number of sealing problems as well as rigid electrical connection problems. For example, the compression set characteristics of the usual non-metal cover materials, such as a combination of an elastomer rubber and a rigid phenolic resin, results in a looseness of the rivet seal and consequent leakage of electrolyte. At the same time, this progressive looseness also causes relative motion between the electrical connection members and a deterioration of that connection. This deterioration is evident by increased $I^2R$ losses which cause excess heating to further deteriorate the seal and electrical connection.

Accordingly, it is an object of this invention to provide an improved rivet seal electrical terminal.

It is another object of this invention to provide an improved electrical terminal rivet seal assembly for an electrolytic capacitor where the rivet member includes a surrounding metal supporting sleeve.

It is a still further object of this invention to provide an improved electrical terminal rivet seal assembly including the combination of a rivet, a surrounding sleeve, and terminal lug which are integrated into a unitary rigid metal structure.

Briefly described, this invention, in one of its preferred forms, includes an aluminum rivet passing through a non-metal cover of an electrolytic capacitor. Surrounding the rivet in nesting concentric relationship is a flanged aluminum sleeve. Deformation of the end of the rivet clamps an external terminal lug against the exposed end of the sleeve, and at the same time compresses the non-metal cover member between the lug and the flange of the sleeve.

This invention will be better understood when taken in connection with the following descriptions and the drawing in which:

The figure is an exemplary illustration of a capacitor assembly illustrating the electrical terminal rivet seal assembly in sectional form.

Referring now to the figure, an exemplary capacitor 10 is illustrated which includes a suitable can or casing 11, a cover assembly 12, and a terminal assembly 13. This invention is more particularly directed to an electrolytic capacitor, and one or more of the noted terminal assemblies 13 may be utilized in conjunction with a convolute anode capacitor section (not shown) with the casing 11. Cover member 12 is usually of an electrically non-conductive material and usually comprises a layered assembly of different materials. For example, cover member 12 includes an outer, relatively rigid phenolic resin or fiber board member 14 and an inner member or layer 15 of, for example, a suitable elastomer material. Cover member 12 also includes a defined aperture 16 therein through which rivet terminal assembly 13 extends.

Rivet terminal assembly 13 includes a metal rivet 17 having a radially extending head portion 18, a shank portion 19 and a deformed portion 20. The deformed portion 20 overlaps and engages a terminal lug 21, and more particularly a radially inwardly extending flange portion 22 on lug 21. Inwardly directed flange portion 22 provides a shelf or surface area parallel to the radial head portion 18 of rivet 17.

The aperture 16 in cover member 12, through which rivet member 17 extends, is made substantially larger in order to accommodate a metal sleeve 23. Metal sleeve 23 is provided with a readily extending flange portion 24, and closely engages the shank portion 19 of rivet 17 with the flange portion 24 and rivet head 18 in nesting concentric relationship.

In the riveting operation, the deformed portion 20 of rivet member 17 provides a clamping action so that sleeve 23 is axially compressed between the deformed rivet portion 20 and the inwardly directed flange 22 of lug 21. Consequently, sleeve 23 is tightly engaged at one end by the flange 22 and at the other end by rivet head 18, and the sleeve 23, rivet 17 and lug 21 are integrated into a rigid unitary structure. A tab member 25 having grooves on its upper and lower surfaces is electrically connected to rivet member 17 by being inserted with its surfaces becoming clampingly engaged between rivet head 18 and flange 24 of sleeve 23. This tab 25 is sufficiently thin so that the overall deformation of rivet member 17 readily accommodates for the thickness thereof.

The clamping or compressing action of the rivet terminal assembly 13 also tightly engages the cover member 12 between the lug flange 22 and the sleeve flange 24. As illustrated in the figure the distance between the sleeve flange 24 and lug flange 22 is less than the initial thickness of cover member 12 and, therefore, compression of cover member 12 may be essentially predetermined by the sleeve, or the sleeve may also be significantly deformed. There is thus provided a very tight seal between the non-metal cover member 12 and the rivet assembly 13. Accordingly, the compression set characteristics of the cover 12 material do not deleteriously effect the long-term seal characteristics of the rivet seal assembly 13.

The rivet and sleeve combination provides an exceptionally tight seal, particularly as compared to a rivet seal without a sleeve. Sleeve member 23 increases the sealing characteristics of the rivet seal terminal of this invention. It is noted that in a preferred embodiment of this invention, rivet member 17 is usually of the same size as other comparable rivet seals, and sleeve 23 is additional rigid metal in the rivet defined opening. Furthermore, in the rivet deformation, the rivet shank portion 19 bulges outwardly to tightly engage the sleeve 23.

The former problems of electrical connection weakening between adjacent metal parts of the rivet seal assembly is substantially minimized because the electrical connection is established through an integral unitary metal structure network. For example, sleeve 23, as a column member, is engaged by a rivet head 18 at one end and a lug flange 22 at the other end to provide a single unitary structure.

While this invention has been described with respect to a preferred embodiment as incorporated in electrical capacitors, the invention is applicable to other electrical devices requiring an appropriate seal including, for example, batteries and other devices containing liquid materials.

While the present invention has been described with reference to particular embodiments thereof, it will be understood that numerous modifications can be made by those skilled in the art without actually departing from the scope of the invention.

What is claimed as new and desired to be secured by Letters Patent of the United States is:

1. A rivet terminal seal assembly for a sealed electrolytic device comprising in combination:
    (a) a non-metallic cover member having an aperture therethrough;
    (b) a metal rivet extending through said aperture;
    (c) said rivet having a head portion at one end thereof and a radially deformed portion at the other end thereof;
    (d) a metal sleeve member concentrically positioned about said rivet and extending through said aperture;
    (e) said sleeve having a flanged portion at one end thereof concentric with said rivet head; and
    (f) an electrical tab positioned between said sleeve flange and said rivet head,
    (g) said tab having grooves on its upper and lower surfaces,
    (h) said surfaces being clampingly engaged respectively against said sleeve flange portion and said rivet head portion.

References Cited
UNITED STATES PATENTS

| | | | |
|---|---|---|---|
| 2,225,801 | 12/1940 | Schnall | 317—230 |
| 2,847,622 | 8/1958 | Bugel | 317—230 |
| 2,862,156 | 11/1958 | Ruben | 317—230 |
| 3,091,656 | 5/1963 | Lamoureaux, Jr. | 317—230 |
| 3,439,232 | 4/1969 | Buskirk et al. | 317—230 |

JAMES D. KALLAM, Primary Examiner

U.S. Cl. X.R.

174—50.52